(12) United States Patent
Nakato et al.

(10) Patent No.: US 7,638,221 B2
(45) Date of Patent: *Dec. 29, 2009

(54) FUEL CELL ELECTROLYTE, MEMBRANE ELECTRODE ASSEMBLY, AND METHOD OF MANUFACTURING FUEL CELL ELECTROLYTE

(75) Inventors: Kunihiro Nakato, Gunma (JP); Atsuo Sonai, Kanagawa (JP)

(73) Assignees: Sanyo Electric Co., Ltd., Osaka (JP); Samsung Electronics Co., Ltd., Gyeonggi-Do (KR); Samsung SDI Co., Ltd., Gyeonggi-Do (KR)

( * ) Notice: Subject to any disclaimer, the term of this patent is extended or adjusted under 35 U.S.C. 154(b) by 360 days.

This patent is subject to a terminal disclaimer.

(21) Appl. No.: 11/387,063

(22) Filed: Mar. 23, 2006

(65) Prior Publication Data

US 2006/0257705 A1    Nov. 16, 2006

(30) Foreign Application Priority Data

Mar. 23, 2005  (JP) ............... 2005-084293
Feb. 24, 2006  (JP) ............... 2006-049338

(51) Int. Cl.
*H01M 8/10* (2006.01)

(52) U.S. Cl. .................................. 429/33
(58) Field of Classification Search ........... None
See application file for complete search history.

(56) References Cited

U.S. PATENT DOCUMENTS

| | | | | |
|---|---|---|---|---|
| 5,525,436 A * | 6/1996 | Savinell et al. | ........ | 429/30 |
| 6,733,927 B1 | 5/2004 | Takezawa et al. | | |
| 2004/0224218 A1* | 11/2004 | Fan | ........ | 429/44 |
| 2005/0084727 A1* | 4/2005 | Kiefer et al. | ........ | 429/33 |
| 2005/0118476 A1 | 6/2005 | Melzner et al. | | |
| 2007/0154778 A1* | 7/2007 | Haufe et al. | ........ | 429/42 |

FOREIGN PATENT DOCUMENTS

| | | |
|---|---|---|
| JP | 11-503262 | 3/1999 |
| JP | 2002-319414 | 10/2002 |
| JP | 2002-533890 | 10/2002 |
| JP | 2007-519183 | 7/2007 |
| KR | 10-2005-0002840 | 1/2005 |
| WO | WO 96/13872 | 5/1996 |
| WO | WO 03/043116 A1 | 5/2003 |
| WO | WO03/074596 A1 * | 9/2003 |
| WO | WO2006/005466 A1 * | 1/2006 |

OTHER PUBLICATIONS

Korean Office Action issued in corresponding Korean Patent Application No. KR 10-2005-0053054, dated Aug. 29, 2006.
Japanese Notification of Reasons for Refusal, with English Translation, issued in Japanese Patent Application No. JP 2006-049339, dated Mar. 24, 2009.
An Office Action issued Jan. 9, 2009 for copending U.S. Appl. No. 11/701,397.
Japanese Notification of Reason(s) for Refusal, w/ English translation thereof, Issued in Patent Application No. JP 2006-049338 dated on Jul. 15, 2008.

* cited by examiner

*Primary Examiner*—Patrick Ryan
*Assistant Examiner*—Muhammad Siddiquee
(74) *Attorney, Agent, or Firm*—McDermott Will & Emery LLP

(57) ABSTRACT

Dimensional change occurring in a fuel cell electrolyte including a basic polymer after the electrolyte is doped with acid is regulated and the occurrence of wrinkles and the like is reduced. A fuel cell electrolyte comprises a basic polymer and an organic phosphonic acid expressed by the following general formula (1):

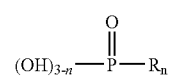

(1)

where R represents an alkyl, aryl, acyl, amino, phosphonic group or a derivative of the functional group, and n is 1 or 2.

11 Claims, 7 Drawing Sheets

FUEL CELL ELECTROLYTE, MEMBRANE ELECTRODE ASSEMBLY, AND METHOD OF MANUFACTURING FUEL CELL ELECTROLYTE

BACKGROUND OF THE INVENTION

1. Field of the Invention

The invention relates to a fuel cell, and more particularly to a fuel cell electrolyte membrane and a membrane electrode assembly which can be used for a fuel cell capable of operation under a nonhumidified state.

2. Description of the Related Art

Solid polymer type fuel cells having an electrolyte made of a solid polymer membrane have been known. The solid polymer type fuel cells use proton conductive polymer electrolyte membranes for their electrolytes. In general, a solid polymer type fuel cell includes an anode (fuel electrode), a cathode (oxidant electrode), and a polymer electrolyte membrane interposed between the anode and the cathode. The anode of the solid polymer type fuel cell is provided with a catalyst layer for promoting oxidation of the fuel. The cathode of the solid polymer type fuel cell is provided with a catalyst layer for promoting reduction of the oxidant.

The fuel to be supplied to the anode of the solid polymer type fuel cell is typically made of hydrogen, a hydrogen-containing gas, a mixed vapor of methanol and water, a methanol aqueous solution, or the like. The oxidant to be supplied to the cathode of the solid polymer type fuel cell is typically made of oxygen, an oxygen-containing gas, or air.

The polymer electrolyte membrane is typically made of sulfonate high-fluorinated polymer which has a backbone chain composed of fluorinated alkylene and a side chain composed of fluorinated vinyl ether having a sulfonic acid group at the end. This type of polymer electrolyte membrane exhibits ion conductivity sufficient for power generation when impregnated with an appropriate amount of water.

For this reason, the conventional solid polymer type fuel cells have required water management on their polymer electrolyte membranes, causing to complicated and large-sized fuel cell systems.

To solve these problems ascribable to the water management on the polymer electrolyte membranes, a nonhumidified electrolyte membrane capable of conducting protons under a nonhumidified state has been developed as an alternative for the conventional polymer electrolyte membranes.

For example, Japanese Patent Laid-Open Publication No. Hei 11-503262 discloses a nonhumidified polymer electrolyte membrane which is made of such a material as polybenzimidazole doped with phosphoric acid.

When a polybenzimidazole or other basic polymer membrane is doped with phosphoric acid, the basic polymer membrane makes dimensional changes because of water absorption of the phosphoric acid. Moreover, when the phosphoric acid absorbs water, it comes out of the basic polymer membrane. As a result, the basic polymer membrane shrinks to cause wrinkles therein. Consequently, the storage of the produced basic polymer membrane and the fabrication of a membrane electrode assembly or a stack require special environmental facilities including a dry room. This produces such problems as a manufacturing difficulty and an increased manufacturing cost.

SUMMARY OF THE INVENTION

The present invention has been achieved in view of the foregoing problems. It is thus an object of the present invention to provide a fuel cell electrolyte which contains a basic polymer whose dimensional changes before and after acid doping are suppressed for lower production of wrinkles. Another object of the preset invention is to provide a membrane electrode assembly which is composed of a fuel cell electrolyte containing a basic polymer and has an improved gas diffusibility.

One of the aspects of the present invention is a fuel cell electrolyte. This fuel cell electrolyte contains a basic polymer and organic phosphonic acid expressed by the following general formula (1):

where R represents an alkyl, aryl, acyl, amino, phosphonic group or a derivative of the functional group, and n is 1 or 2.

Consequently, a fuel cell electrolyte having a level of proton conductivity equivalent to that of conventional fuel cell electrolytes is obtained with suppressed dimensional changes, wrinkle production, etc.

In the fuel cell electrolyte according to the foregoing aspect, the basic polymer is preferably selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines, and polyvinylimidazoles. Moreover, in the fuel cell electrolyte of the foregoing aspect, the basic polymer may contain poly-2,5-benzimidazole.

In the fuel cell electrolyte of the foregoing aspect, the basic polymer may be cross-linked. As a result of this, the rigidity of the basic polymer is improved and the fuel cell electrolyte is less likely to shrink and expand.

In the fuel cell electrolyte of the foregoing aspect, the organic phosphonic acid may preferably be selected from the group consisting of ethylphosphonic acid, methylphosphonic acid and octylphosphonic acid. The organic phosphonic acid may be as expressed by a general formula (2) below.

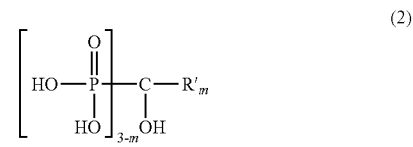

where R' represents an alkyl, aryl, acyl, amino, phosphonic group or a derivative of the functional group, and m is 1 or 2.

The fuel cell electrolyte may be doped with 800 mol % or less, or, more preferably, 200 mol % or less of phosphoric acid with respect to the basic polymer as a reference. Such a formulation controls water absorption by phosphoric acid and improves aging time of a cell voltage.

The fuel cell electrolyte of the foregoing aspect may have a water content of 20% or less. The definition of the water content will be given later. The fuel cell electrolyte of the foregoing aspect may also have an expansion ratio of 20% or less. The definition of the expansion ratio will be given later.

Another aspect of the present invention is a membrane electrode assembly. This membrane electrode assembly comprises any one of the foregoing fuel cell electrolytes, an anode joined to one side of the fuel cell electrolyte, and a cathode joined to another side of the fuel cell electrolyte. Here, at least one of the anode and the cathode contains an organic phosphonic acid expressed by the general formula (1).

Consequently, the membrane electrode assembly contains the fuel cell electrolyte which has a level of proton conductivity equivalent to that of conventional fuel cell electrolytes while dimensional changes and wrinkles thereof are suppressed. Consequently, manufacturing the membrane electrode assembly requires no special facility such as a dry room, and thus allows a reduction in the manufacturing cost. Since at least one of the anode and the cathode is doped with an organic phosphonic acid, the interface resistance between the electrode(s) (the anode and/or the cathode) and the fuel cell electrolyte decreases. Moreover, the gas diffusibility is remarkably improved.

In the membrane electrode assembly, at least one of the anode and the cathode may include an organic phosphonic acid selected from the group consisting of ethylphosphonic acid, methylphosphonic acid and octylphosphonic acid.

In the membrane electrode assembly, a total sum of an amount of the organic phosphonic acid contained in the fuel cell electrolyte, an amount of the organic phosphonic acid contained in the anode, and an amount of the organic phosphonic acid contained in the cathode may be in the range of 100% to 800% by mol with respect to the basic polymer.

Another aspect of the present invention is a membrane electrode assembly. This membrane electrode assembly comprises any one of the foregoing fuel cell electrolytes, an anode joined to one side of the fuel cell electrolyte, and a cathode joined to another side of the fuel cell electrolyte. Here, at least one of the anode and the cathode contains a hydrolyzable phosphate compound expressed by the general formula (3).

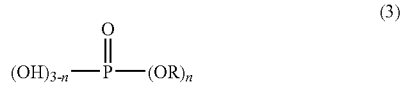

(3)

where R represents an alkyl or alkoxyalkyl group, and n is 1 or 2.

Thus, the membrane electrode assembly is manufactured by using a fuel cell electrolyte which has a level of proton conductivity equivalent to that of conventional fuel cell electrolytes while dimensional changes and wrinkles thereof are suppressed. Consequently, manufacturing of the membrane electrode assembly requires no special facility such as a dry room, and thus allows a reduction in the manufacturing cost. Since at least one of the anode and the cathode is doped with a phosphate compound, the interface resistance between the electrode(s) (the anode and/or the cathode) and the fuel cell electrolyte decreases. Moreover, the gas diffusibility is remarkably improved.

Moreover, in the membrane electrode assembly, at least one of the anode and the cathode may contain a phosphate compound selected from the group consisting of ethyl acid phosphate, methyl acid phosphate, butyl acid phosphate, oleyl acid phosphate, and dibutyl phosphate.

In the membrane electrode assembly, at least one of the anode and the cathode may contain a phosphate compound selected from the group consisting of monoethyl phosphate, monomethyl phosphate, mono-n-butyl phosphate, and mono-n-octyl phosphate.

In the membrane electrode assembly, a total sum of an amount of the organic phosphonic acid contained in the fuel cell electrolyte, an amount of the phosphate compound contained in the anode, and an amount of the phosphate compound contained in the cathode may be in the range of 5% to 800% by mol with respect to the basic polymer.

Still another aspect of the present invention is a method of manufacturing a fuel cell electrolyte. The method of manufacturing a fuel cell electrolyte comprises: casting a basic polymer; and impregnating the basic polymer with an aqueous solution in which an organic phosphonic acid expressed by the general formula (1) is dissolved.

In the method of manufacturing a fuel cell electrolyte, the organic phosphonic acid may be selected from the group consisting of ethylphosphonic acid, methylphosphonic acid and octylphosphonic acid.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Embodiment 1

Figure 1:
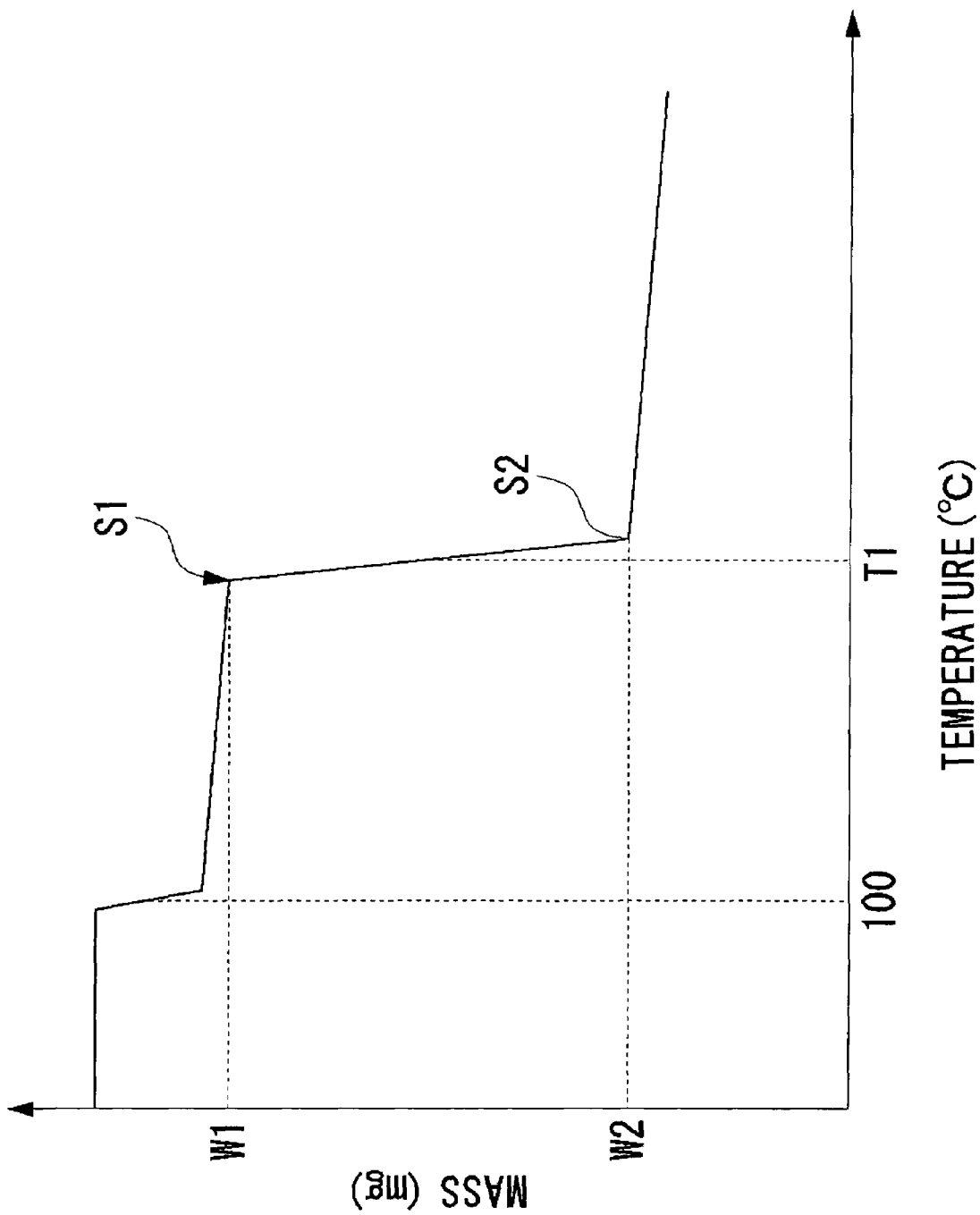
FIG. 1 is a diagram schematically showing a TG chart for calculating water content.

A fuel cell electrolyte according to the present embodiment contains a basic polymer and an organic phoshonic acid compound expressed by the following general formula (4):

(4)

where R represents an alkyl, aryl, acyl, amino, phosphonic group or a derivative of the functional group, and n is 1 or 2.

(Basic Polymer)

The basic polymer is preferably selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines, and polyvinylimidazoles.

It is preferable that the basic polymer be cross-linked by a cross-linking agent. Cross-linking the basic polymer improves the rigidity of the fuel cell electrolyte and controls elasticity. Any cross-linking agent suitable for the cross-linking reaction of the basic polymer may be employed. For example, urethane cross-linking agent may be used.

(Organic Phosphonic Acid)

Organic phosphonic acid may be selected from the group consisting of ethylphosphonic acid, methylphosphonic acid and octylphosphonic acid. It is preferable that the organic phosphonic acid immersed in the fuel cell electrolyte be 100 mol % or more with respect to the basic polymer as a reference. If the amount of organic phosphonic acid added is less than 100 mol % with respect to the basic polymer as a reference, such functions as proton conductivity in the fuel cell electrolyte suffer.

The organic phosphonic acid may be as expressed by a general formula (5) below.

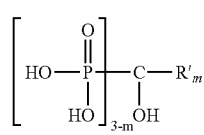
(5)

where R' represents an alkyl, aryl, acyl, amino, phosphonic group or a derivative of the functional group, and m is 1 or 2.

For example, the following expression (6) represents hydroxyethane diphosphonic acid (HEDP) derived by substituting m=1 and R'=CH3 into the expression (5). HEDP is available from Nippon Chemical Industrial CO., LTD by a product name Deflock EH06 (aqueous solution of 60% HEDP).

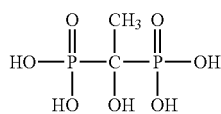
(6)

The fuel cell electrolyte according to the present embodiment is suppressed to 20% or less, and preferably 10% or less, in the expansion ratio which is determined by an expansion ratio evaluation method to be described later.

Since the basic polymer is doped with an organic phosphonic acid of low water absorption, the fuel cell electrolyte according to the present embodiment has the property of causing less dimensional changes and less wrinkles before and after the doping of the organic phosphonic acid.

Incidentally, the fuel cell electrolyte according to the present embodiment is obtained by impregnating the basic polymer with an aqueous solution of the organic phosphonic acid. After the impregnation, the water content of the organic phosphonic acid thus decreases gradually with time, such as at the process of drying, at the process of loading into a fuel cell, and in the stage of use as a product. After the fuel cell electrolyte is loaded in a fuel cell and the resulting product is operated under normal conditions such as at 150° C. with no humidification, the fuel cell electrolyte finally falls to a water content of approximately zero.

(Water Content Evaluation Method)

Hereinafter, description will be given of the method of evaluating the fuel cell electrolyte for water content.

Initially, thermogravimetric (TG) measurement is performed on the organic phosphonic acid itself for the basic polymer to be doped with, thereby grasping a temperature T1 across which a sharp decrease in mass occurs from decomposition or dehydration of the organic phosphonic acid. Given that the temperature T1 is approximately 150° C. or higher, it is confirmed that the target sample of the water content measurement will decrease in mass, up to 100° C. or so, because of evaporation of the water contained in the sample independently of the organic phosphonic acid. Incidentally, it has been confirmed that none of the organic phosphonic acids mentioned above causes a sharp decrease in mass up to 160° C.

Next, TG measurement is performed on the target sample of the water content measurement. FIG. 1 schematically shows a TG chart for calculating the water content. In FIG. 1, the mass change across a temperature of 100° C. occurs from the evaporation of water contained in the sample independently of the organic phosphonic acid. The mass change across a temperature of T1 occurs from the decomposition or dehydration of the organic phosphonic acid. The sample is measured for weights W1 and W2 which correspond to inflection points S1 and S2 of the mass change across the temperature of T1, respectively. The water content is calculated by the equation: water content=(W1−W2)/W1×100.

The temperatures corresponding to the respective inflection points S1 and S2 are suitably determined by differential thermogravimetry (DTG). In DTG, the positions of the inflection points S1 and S2 appear as peaks. The weights at the inflection points S1 and S2 can thus be determined from the peak positions in DTG.

(Expansion Ratio Evaluation Method)

Hereinafter, description will be given of the method of evaluating the fuel cell electrolyte for expansion ratio S. The expansion ratio S is calculated by the equation: S=(Y−X)/X×100 (%). Here, X is the length of a predetermined side of the fuel cell electrolyte before the basic polymer is doped with the organic phosphonic acid. Y is the length of the predetermined side of the fuel cell electrolyte at an arbitrary point in time after the basic polymer is doped with the phosphate compound.

The fuel cell electrolyte of the first embodiment may be doped variously.

For example, the fuel cell electrolyte may be doped with 800 mol % or less, or, more preferably, 200 mol % or less of phosphoric acid with respect to the basic polymer as a reference. By ensuring that the amount of phosphoric cid is 800 mol % or less with respect to the basic polymer as a reference, aging time of a cell voltage is improved, while controlling water absorption due to the phosphoric acid. Further, by ensuring that the amount of phosphoric cid is 200 mol % or less with respect to the basic polymer as a reference, aging time of a cell voltage is improved, while further controlling water absorption due to the phosphoric acid. In contrast, if the amount of phosphoric acid exceeds 800 mol % with respect to the basic polymer as a reference, water absorption control exercised by the phosphoric acid suffers and there will be marked size change in the fuel cell electrolyte.

Embodiment 2

A membrane electrode assembly according to the present embodiment is obtained by joining an anode to one of the sides of the foregoing fuel cell electrolyte, and joining a cathode to the other side of the fuel cell electrolyte.

The membrane electrode assembly of the present embodiment is characterized in that at least one of the anode and the cathode contains an organic phosphonic acid expressed by the foregoing general formula (4). The membrane electrode assembly of the present embodiment is composed of the fuel cell electrolyte which has a level of proton conductivity equivalent to that of conventional fuel cell electrolytes while dimensional changes and wrinkles thereof are suppressed. Consequently, manufacturing the membrane electrode assembly requires no special facility such as a dry room, and thus allows a reduction in the manufacturing cost. Since at least one of the anode and the cathode is doped with the organic phosphonic acid, the interface resistance between the electrode and the fuel cell electrolyte decreases. Moreover, the gas diffusibility is remarkably improved.

The anode or cathode doped with the organic phosphonic acid is obtained by coating the anode or cathode with the organic phosphonic acid and then drying it at 80° C. for 120 min. Incidentally, the drying temperature and the drying time may be changed as appropriate.

In the membrane electrode assembly, the organic phosphonic acid included in at least one of the anode and the cathode is preferably selected from the group consisting of ethylphosphonic acid, methylphosphonic acid and octylphosphonic acid.

In the membrane electrode assembly according to the present embodiment, the total sum of the amount of the organic phosphonic acid contained in the fuel cell electrolyte, the amount of the organic phosphonic acid contained in the anode, and the amount of the organic phosphonic acid contained in the cathode may preferably be in the range of 100% to 800% by mol with respect to the basic polymer.

Even when the total sum of the organic phosphonic acids lies in the range of 100% and 800% by mol with respect to the basic polymer, proton conductivities sufficient for the generation condition can be obtained. That is, only a smaller amount of phosphate compounds is required. It is therefore possible to lower the manufacturing cost of the membrane electrode assembly.

When both the anode and the cathode are doped with organic phosphonic acids, the anode is preferably doped with a greater amount of organic phosphonic acid than the cathode is.

This can further decrease the interface resistance between the electrodes and the fuel cell electrolyte decreases. Moreover, the gas diffusibility is remarkably improved.

Embodiment 3

A membrane electrode assembly according to the present embodiment is obtained by joining an anode to one of the sides of the foregoing fuel cell electrolyte, and joining a cathode to the other side of the fuel cell electrolyte.

The membrane electrode assembly of the present embodiment is characterized in that at least one of the anode and the cathode contains a phosphate compound expressed by the foregoing general formula (7). The membrane electrode assembly of the present embodiment is composed of the fuel cell electrolyte which has a level of proton conductivity equivalent to that of conventional fuel cell electrolytes while dimensional changes and wrinkles thereof are suppressed. Consequently, manufacturing the membrane electrode assembly requires no special facility such as a dry room, and thus allows a reduction in the manufacturing cost. Since at least one of the anode and the cathode is doped with the phosphate compound, the interface resistance between the electrode and the fuel cell electrolyte decreases. Moreover, the gas diffusibility is remarkably improved.

(7)

where R represents an alkyl or alkoxyalkyl group, and n is 1 or 2.

The anode or cathode doped with the phosphate compound is obtained by coating the anode or cathode with the phosphate compound and then drying it at 80° C. for 120 min. Incidentally, the drying temperature and the drying time may be changed as appropriate.

The phosphate compound included in at least one of the anode and the cathode is preferably selected from the group consisting of ethyl acid phosphate, methyl acid phosphate, butyl acid phosphate, oleyl acid phosphate, and dibutyl phosphate.

The phosphate compound included in at least one of the anode and the cathode is preferably selected from the group consisting of monoethyl phosphate, monomethyl phosphate, mono-n-butyl phosphate, and mono-n-octyl phosphate.

The phosphate compound included in at least one of the anode and the cathode is preferably butoxyethyl acid phosphate.

In the membrane electrode assembly according to the present embodiment, the total sum of the amount of the organic phosphonic acid contained in the fuel cell electrolyte, the amount of the phosphate compound contained in the anode, and the amount of the phosphate compound contained in the cathode may preferably be in the range of 5% to 800% by mol with respect to the basic polymer.

EXAMPLE 1

Hereinafter, description will be given of the method of manufacturing a typical fuel cell electrolyte according to the present invention. Here, polybenzimidazole (PBI) was used as the basic polymer, and ethylphosphonic acid as the organic phosphonic acid.

Initially, PBI (20%) was dissolved in LiCl(2%)-containing dimethylacetamide. The PBI solution was cast onto a glass plate to form a PBI film.

Next, 0.13 g of PBI film (0.00042 mol) was immersed in a beaker of 40% ethylphosphonic acid solution (solvent: water) at room temperatures for two hours. Subsequently, the PBI film was pulled out. The excess solvent adhering thereon was wiped off and removed with a wiping cloth, thereby completing the fuel cell electrolyte. The weight after the immersion was 0.22 g. As will be described, the fuel cell electrolyte of this Example was approximately zero in the water content. The weight of the ethylphosphonic acid, or the dopant, was thus approximately 0.09 g (0.00081 mol). As a result, the doping ratio of the ethylphosphonic acid was 192% by mole with reference to PBI.

COMPARATIVE EXAMPLE 1

For the sake of comparison with the Example 1, a fuel cell electrolyte was prepared from PBI doped with phosphoric acid.

Like the Example 1, a PBI film was formed, and then 0.15 g (0.00049 mol) of the PBI film was immersed in a beaker of 85% phosphoric acid solution at room temperatures for 24 hours. Subsequently, the PBI film was pulled out. The excess solvent adhering thereon was wiped off and removed with a wiping cloth, thereby completing the fuel cell electrolyte. The weight after the immersion was 0.58 g. As a result, the doping ratio of the phosphoric acid was 900% by mole with reference to PBI.

(Result of Evaluation on Water Content)

Figure 2:
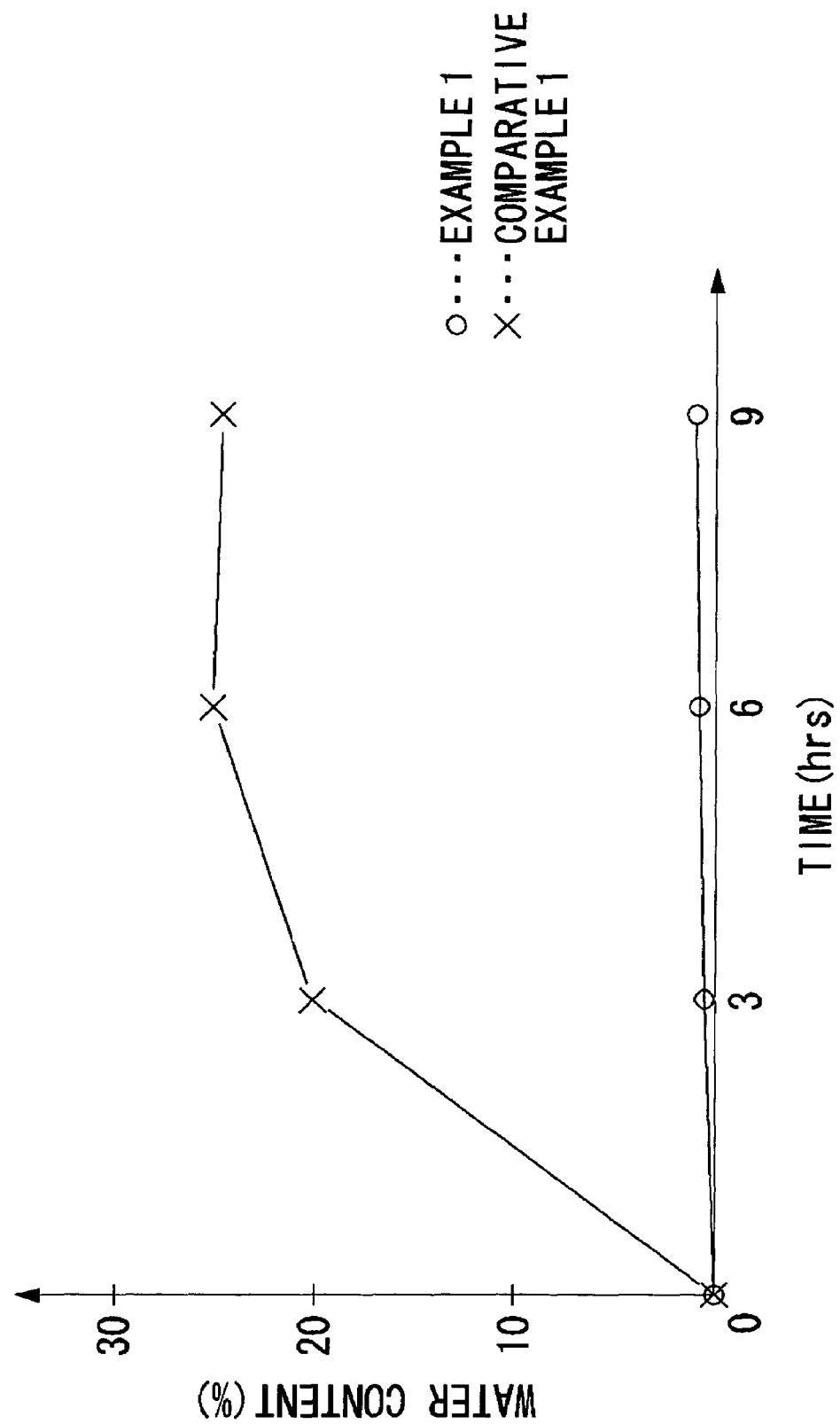
FIG. 2 is a graph for showing time dependence of the water contents of Example 1 and Comparative Example 1 which were stored at 22° C. and 62% RH after acid doping, the water contents being determined by a particular water content evaluation method.

FIG. 2 is a graph showing time dependence of the water contents of the Example 1 and the Comparative Example 1 which were stored at 22° C. and 62% RH after the acid doping. The water contents were measured by the water content evaluation method described above.

It is shown that the water content of the fuel cell electrolyte according to the Comparative Example 1 increases with a lapse of time due to the water absorption of the phosphoric acid. In the Comparative Example 1, the water content reached 25% after nine hours since the doping of the phosphoric acid. Moreover, in the Comparative Example 1, the absorption of atmospheric water in the fuel cell electrolyte swelled the fuel cell electrolyte in volume. The phenomenon that the phosphoric acid came out of the fuel cell electrolyte was also observed. Consequently, in the fuel cell electrolyte of the Comparative Example 1, the total weight of the phosphoric acid and the PBI seems to decrease with time.

On the other hand, the Example 1 caused little change in weight after the storage in the atmosphere. This confirms that the foregoing problems have been solved.

(Result of Evaluation on Expansion Ratio)

Table 1 shows the expansion ratios of the fuel cell electrolytes according to the Example 1 and the Comparative Example 1, before and after the doping of monoethyl acid phosphate and phosphoric acid, respectively. After the acid doping, the articles were stored under the conditions of 22° C. and 62% RH for nine hours. The Comparative Example 1 showed an expansion ratio as high as 25%. It is shown that wrinkles can occur easily and special measures such as the use of a dry room must be taken in order to fabricate a membrane electrode assembly or a stack. On the other hand, the Example 1 was suppressed to an expansion ratio of 6%. Neither dimensional change nor wrinkle was observed.

TABLE 1

|  | EXPANSION RATIO (%) |
|---|---|
| EXAMPLE 1 | 6 |
| COMPARATIVE EXAMPLE 1 | 25 |

EXAMPLE 2

A membrane electrode assembly was fabricated by joining an anode to one side and joining a cathode to the other side of the fuel cell electrolyte obtained in the Example 1. The anode and the cathode were HT140E-W from E-TEK Inc. For the sake of reducing the interface resistances between the electrolyte membrane and the electrodes, the surfaces of the anode and the cathode were doped with ethylphosphonic acid. The amount of ethylphosphonic acid for the PBI, the anode, and the cathode to be doped with was 200% by mol with reference to the PBI.

COMPARATIVE EXAMPLE 2

A membrane electrode assembly was fabricated by joining an anode to one side and joining a cathode to the other side of the fuel cell electrolyte obtained in the Example 1. The anode and the cathode were HT140E-W from E-TEK Inc. For the sake of reducing the interface resistances between the electrolyte membrane and the electrodes, the surfaces of the anode and the cathode were doped with phosphoric acid of 105% by weight. The amount of phosphoric acid for the anode and the cathode to be doped with was 800% by mol with reference to the PBI.

(Measurements on Proton Conductivity)

The fuel cell electrolytes obtained in the Example 2 and the Comparative Example 2 were loaded into respective fuel cells, and measured for proton conductivity. The proton conductivities of each fuel cells were measured at a temperature of 150° C. The flow rates of hydrogen and air were 100 and 200 (NCCM), respectively. The areas of the fuel cell electrodes were 7.8 cm$^2$.

As a result, the Comparative Example 2 showed a proton conductivity of $7 \times 10^{-2}$ S/cm while the Example 2 showed a proton conductivity of $6 \times 10^{-2}$ S/cm. This confirms that the proton conductivity of the Example 2 is at a level equivalent to that of the Comparative Example 2.

(Time Dependence in Open-Circuit Voltage and Cell Resistance)

Figure 3:
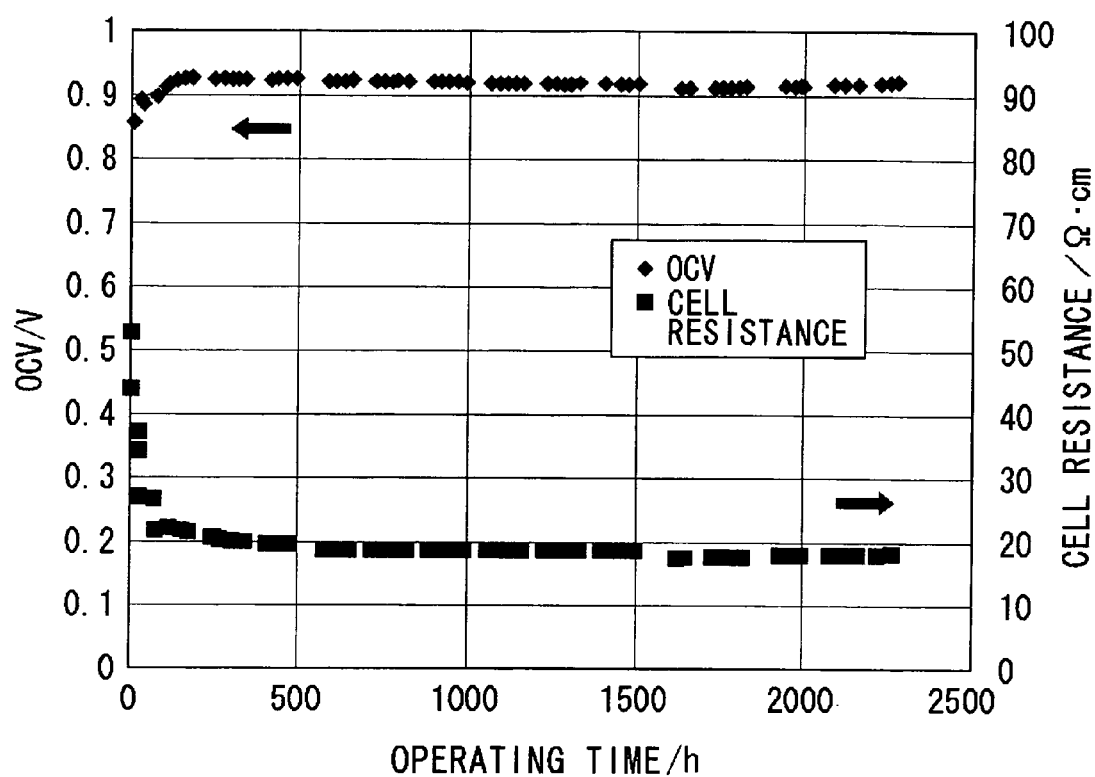
FIG. 3 is a graph showing measurements of time dependence of open circuit voltage and cell resistance of Example 2 at 150° C. and in a nonhumidified state.

FIG. 3 is a graph showing measurements of time dependence of open circuit voltage and cell resistance of Example 2 at 150° C. and in a nonhumidified state. The graph confirms a favorable result, showing that drop in open-circuit voltage or increase in cell resistance does not occur in Example 2 over a period of 2000 hours or longer.

(Measurements on Current-Voltage Characteristics)

Example 2 and the Comparative Example 2 were loaded into respective fuel cells, and measured for current-voltage characteristics in a nonhumidified state. The current-voltage characteristics of the fuel cells were measured at a temperature of 150° C. The flow rates of hydrogen and air were 100 and 200 (NCCM), respectively. The areas of the fuel cell electrodes were 7.8 cm$^2$.

Figure 4:
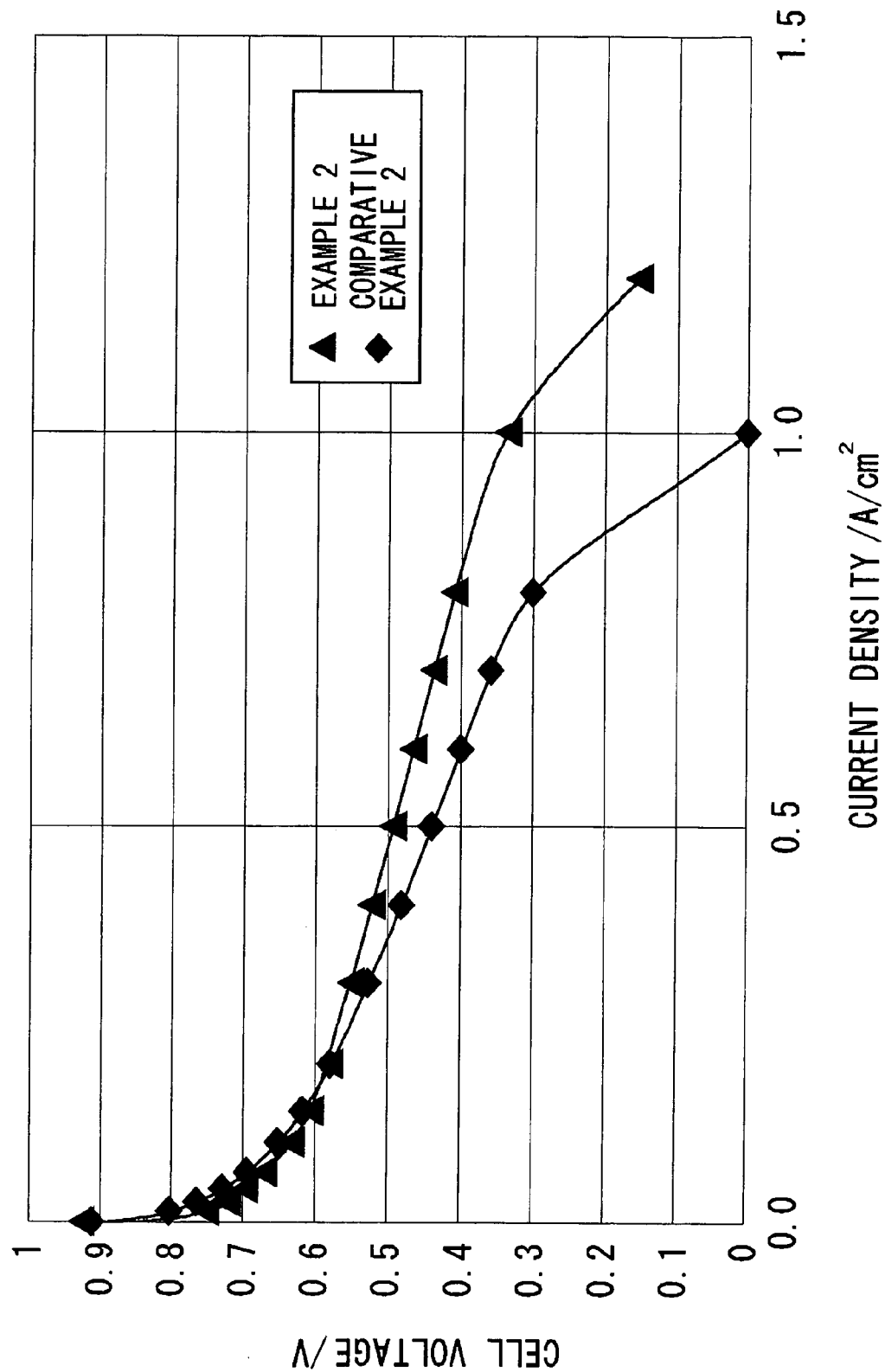
FIG. 4 is a graph showing the current-voltage characteristics of Example 2 and Comparative Example 2.

FIG. 4 is a graph for showing the current-voltage characteristics of the Example 2 and the Comparative Example 2. In the Comparative Example 2, loads up to 0.8 A/cm$^2$ were available while generating cell voltages of 0.3 (V) and higher. In the Example 2, loads as high as 1.0 A/cm$^2$ were available. This shows that the Example 2 has an improved gas diffusibility.

The reason for this is considered as follows: The phosphoric acid is totally liquid, and thus has high mobility. Here, the development of wetting makes it difficult to maintain the three-phase interface formed by the catalyst, the reactive gas, and the electrolytic solution. In contrast, ethylphosphoric acid has low mobility and it is therefore easier to maintain the three-phase interface.

EXAMPLE 3

The membrane electrode assembly of Example 3 is obtained by assembling the fuel cell electrolyte fabricated using a process similar to that of Example 1 and using HEDP instead of ethylphosphonic acid, between the anode and cathode fabricated using a process similar to that of Example 1 and using HEDP instead of ethylphosphonic acid. The doping ratio of HEDP in the fuel cell electrolyte is 240% by mole with reference to PBI. The doping ratios of HEDP in the anode and cathode are 150% by mole and 90% by mole, respectively.

Figure 5:
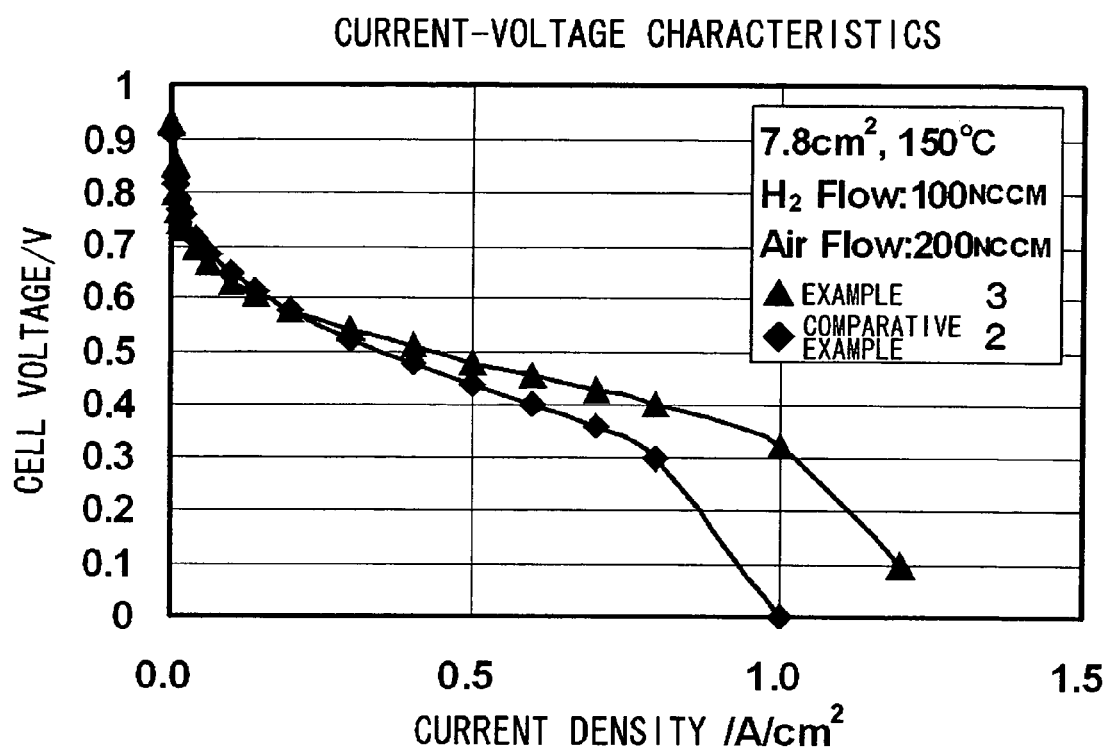
FIG. 5 is a graph showing the current-voltage characteristics of Example 3 and Comparative Example 2.

Current-voltage characteristic measurements were made in the membrane electrode assembly of Example 3 under similar measurement conditions as applied to the membrane electrode assembly of Example 2. FIG. 5 is a graph showing the current-voltage characteristics of Example 3 and Comparative Example 2. As in the case of Example 2, higher loads were available for generation of a predetermined cell voltage than in Comparative Example 2. That is, the membrane electrode assembly of Example 3 exhibits more favorable gas diffusibility in comparison with that of Comparative Example 2.

(Measurements from Shrinkage Test in Fuel Cell Electrolyte)

A thermomechanical analyzer (TMA) was used to test fuel cell electrolytes for shrinkage characteristics that vary depending on whether there is a cross-linked basic polymer. More specifically, a sample was heated at 150° C. and then applied a compressive load by probe at a speed of 18 kgfcm$^{-2}$. When the compressive load reached 18 kgfcm$^{-2}$, the compressive load is maintained at a constant level. The shrinkage characteristics of the sample were obtained by measuring the displacement of the probe occurring since the start of the load application. The fuel cell electrolytes of Example 1 and Example 4 (described later) were used as samples.

EXAMPLE 4

The fuel cell electrolyte of Example 4 includes cross-linked PBI doped with ethylphosphonic acid.

The method of fabricating the fuel cell electrolyte of Example 4 is the same as that of Example 1 except that PBI cross-linked by a cross-linking agent was used.

Figure 6:
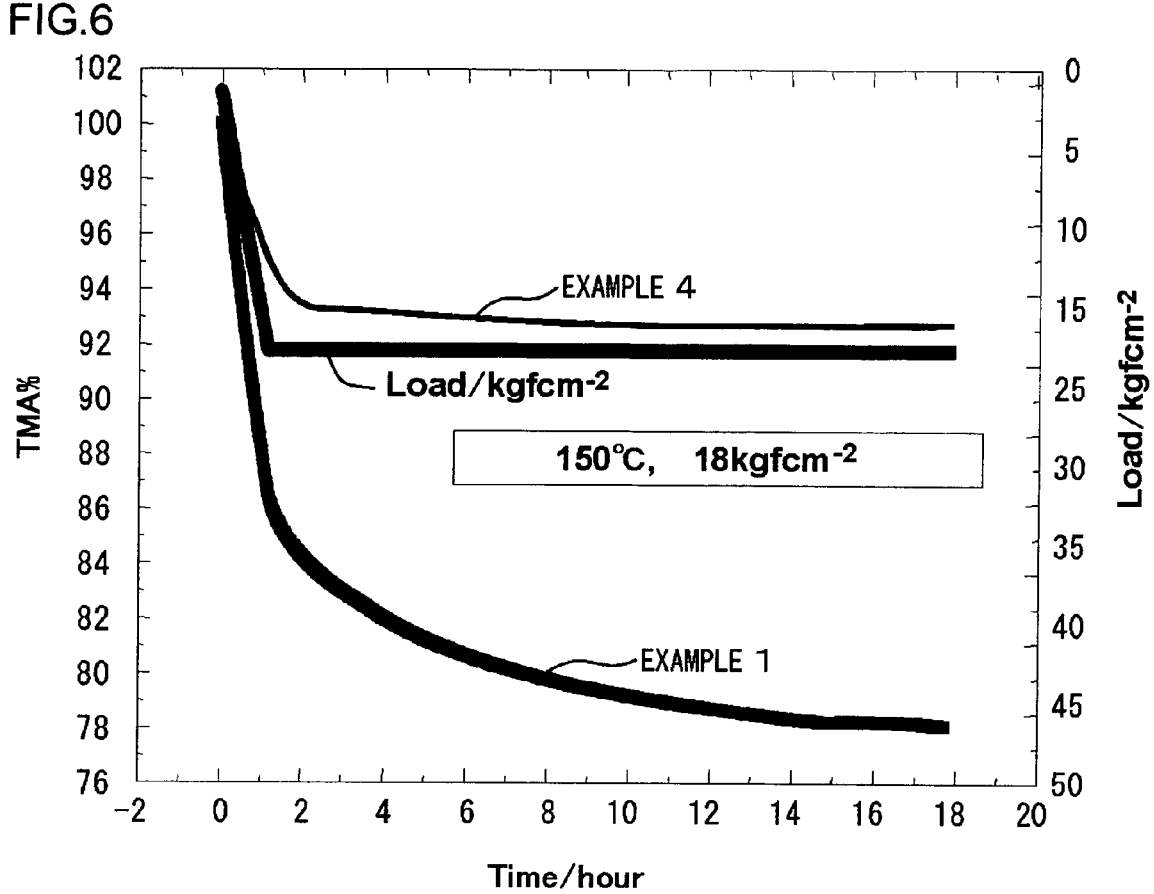
FIG. 6 is a graph showing the shrink characteristics obtained by TMA measurement of Example 1 and Example 4.

FIG. 6 is a graph showing the shrink characteristics obtained by TMA measurement on the fuel cell electrolytes of Example 1 and Example 4. In the fuel cell electrolyte in which PBI is not cross-linked (Example 1), shrinkage progresses rapidly as the compressive load is increased. Even after the compressive load is maintained at a constant level, shrinkage continues to progress slowly. In contrast, in the fuel cell electrolyte in which PBI is cross-linked (Example 4), shrinkage progresses more moderately than in Example 1 as the compressive load is increased. Shrinkage is substantially halted when the compressive load is maintained at a constant level, demonstrating that shrinkage of the fuel cell electrolyte is mitigated by cross-linking PBI.

(Measurement Results From Testing Cell Voltage Time Dependence)

The fuel cell electrolytes obtained in the Example 1 and the Example 5 described later were loaded into respective fuel cells, and measured for time dependence of output voltage in a nonhumidified state, while the current density is maintained at a constant level (0.3A/cm2). The temperature of the fuel cell was 150° C. when the output voltage was measured. The flow rates of hydrogen and air were 100 and 200 (NCCM), respectively. The areas of the fuel cell electrodes were 7.8 cm2.

The anode and the cathode assembled with the fuel cell electrolyte of Example 1 and Example 5 were HT140E-W from E-TEK Inc.

EXAMPLE 5

The fuel cell electrolyte of Example 5 differs from that of Example 1 in that the fuel cell electrolyte including PBI and ethylphosphonic acid is doped with phosphoric acid. The doping ratio of ethylphosphonic acid and phosphoric acid in the fuel cell electrolyte of Example 5 is 100% by mole with respect to PBI. The fuel cell electrolyte of Example 5 is obtained by doping the fuel cell electrolyte with ethylphosphonic acid, as is done in Example 1, spreading 85% phosphoric acid solution over the fuel cell electrolyte so as to dope the electrolyte with phosphoric acid of 100% by mole, and drying the electrolyte at 120° C. for two hours.

Figure 7:
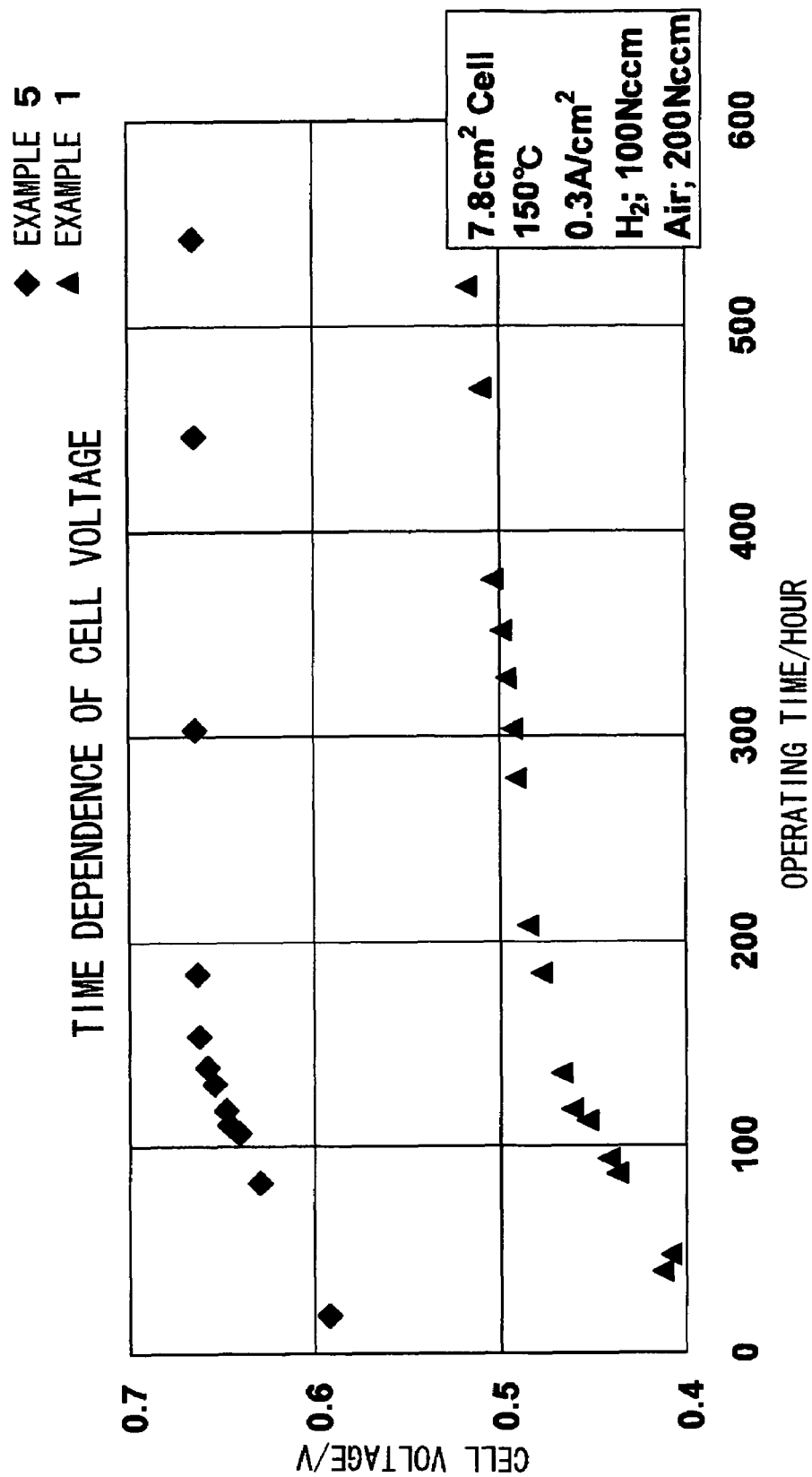
FIG. 7 is a graph showing measurements of the time dependence of a cell voltage of Example 1 and Example 5.

FIG. 7 is a graph showing measurements of the time dependence of a cell voltage of a fuel cell using the fuel cell electrolyte of Example 1 and Example 5. The fuel cell using the fuel cell electrolyte of Example 5 not only exhibits improvement in cell voltage at a given point of time but also exhibits reduced aging time elapsed before the cell voltage is brought to a constant level. This allows manufacturers to ship fuel cells earlier. As the time required to fabricate a fuel cell is reduced, the fabrication cost is reduced accordingly.

What is claimed is:

1. A membrane electrode assembly comprising:
a fuel cell electrolyte comprising a basic polymer; and an organic phosphonic acid expressed by the following general formula (1):

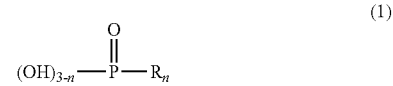

(1)

wherein R represents an alkyl group, an aryl group, an acyl group, an amino group, a phosphonic group, or a derivative of any of these functional groups, and n is 1 or 2;
an anode joined to one side of the fuel cell electrolyte; and
a cathode joined to another side of the fuel cell electrolyte, wherein
the anode and the cathode contain an organic phosphonic acid expressed by the general formula (1), wherein
the amount of the organic phosphonic acid doped in the anode is greater than the amount of the organic phosphonic acid doped in the cathode.

2. The membrane electrode assembly according to claim 1, wherein
the anode and the cathode contain an organic phosphonic acid selected from the group consisting of ethylphosphonic acid, methylphosphonic acid and octylphosphonic acid.

3. The membrane electrode assembly according to claim 1, wherein
a total sum of an amount of the organic phosphonic acid contained in the fuel cell electrolyte, an amount of the organic phosphonic acid contained in the anode, and an amount of the organic phosphonic acid contained in the cathode may be in the range of 100% to 800% by mol with respect to the basic polymer.

4. The membrane electrode assembly according to claim 1, wherein
the basic polymer is selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetra-azapyrenes), polyoxazoles, polythiazoles, polyvinylpyridines, and polyvinylimidazoles.

5. The membrane electrode assembly according to claim 1, wherein the basic polymer contains poly-2, 5-benzimidazole.

6. The fuel cell electrolyte according to claim 1, wherein the basic polymer is cross-linked.

7. The membrane electrode assembly according to claim 1, wherein
the organic phosphonic acid is preferably selected from the group consisting of ethyl phosphonate, methyl phosphonate, and octyl phosphonate.

8. The membrane electrode assembly according to claim 1, wherein the organic phosphonic acid is expressed by the following general formula (2):

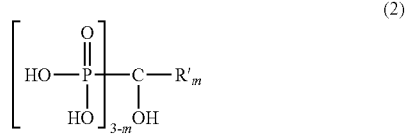

(2)

where R' represents an alkyl group, an aryl group, an acyl group, an amino group, a phosphonic group, or a derivative of any of these functional groups, and m is 1 or 2.

9. The membrane electrode assembly according to claim 1, doped with 800 mol % or less of phosphoric acid with respect to the basic polymer as a reference.

10. The membrane electrode assembly according to claim 1, having a water content of 20% or less.

11. The membrane electrode assembly according to claim 1, having an expansion ratio of 20% or less.

\* \* \* \* \*

UNITED STATES PATENT AND TRADEMARK OFFICE
CERTIFICATE OF CORRECTION

PATENT NO. : 7,638,221 B2
APPLICATION NO. : 11/387063
DATED : December 29, 2009
INVENTOR(S) : Nakato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this

Ninth Day of November, 2010

David J. Kappos
*Director of the United States Patent and Trademark Office*